June 15, 1954 A. V. HAEFF 2,681,425
SIGNAL INTEGRATING TUBE
Filed Jan. 10, 1947 4 Sheets-Sheet 2
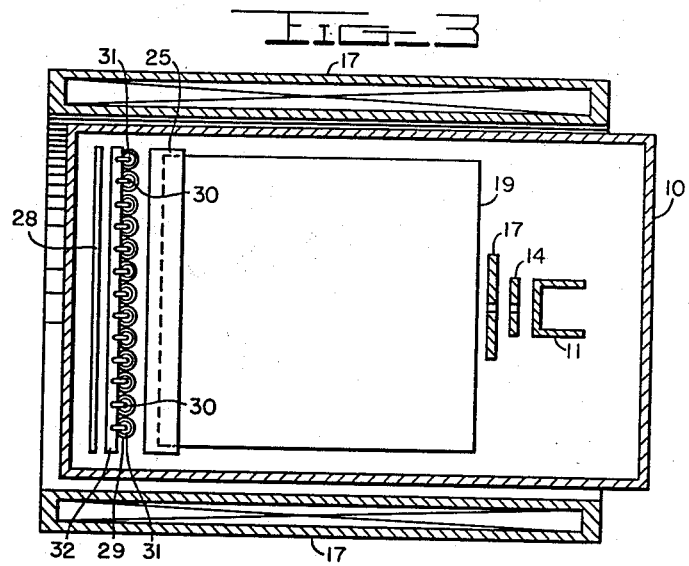
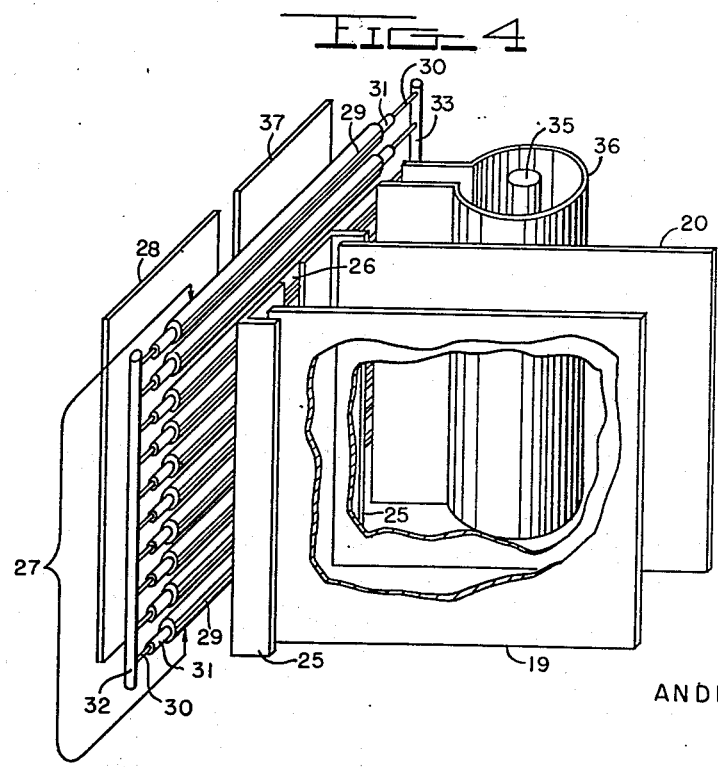
Inventor
ANDREW V. HAEFF

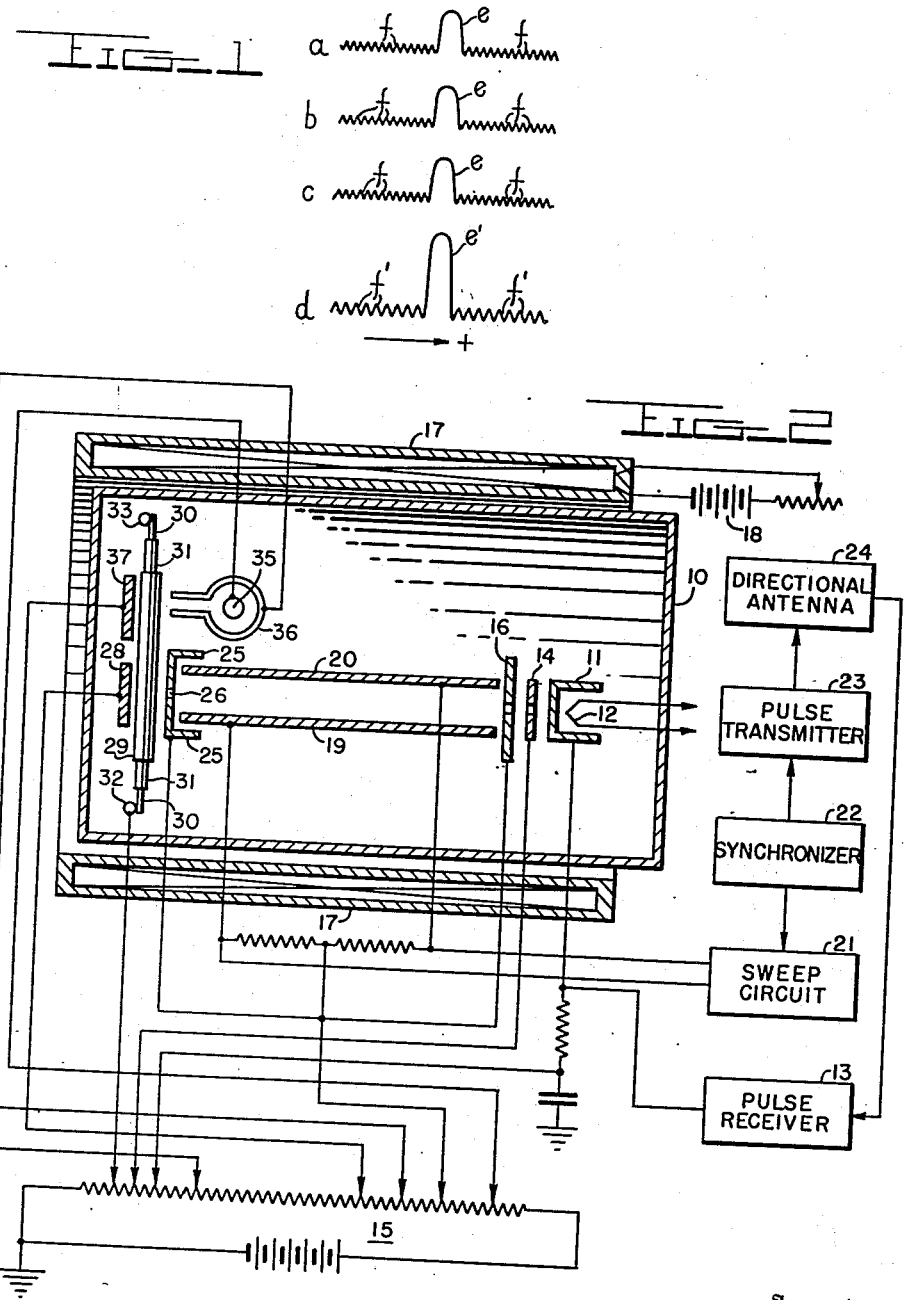

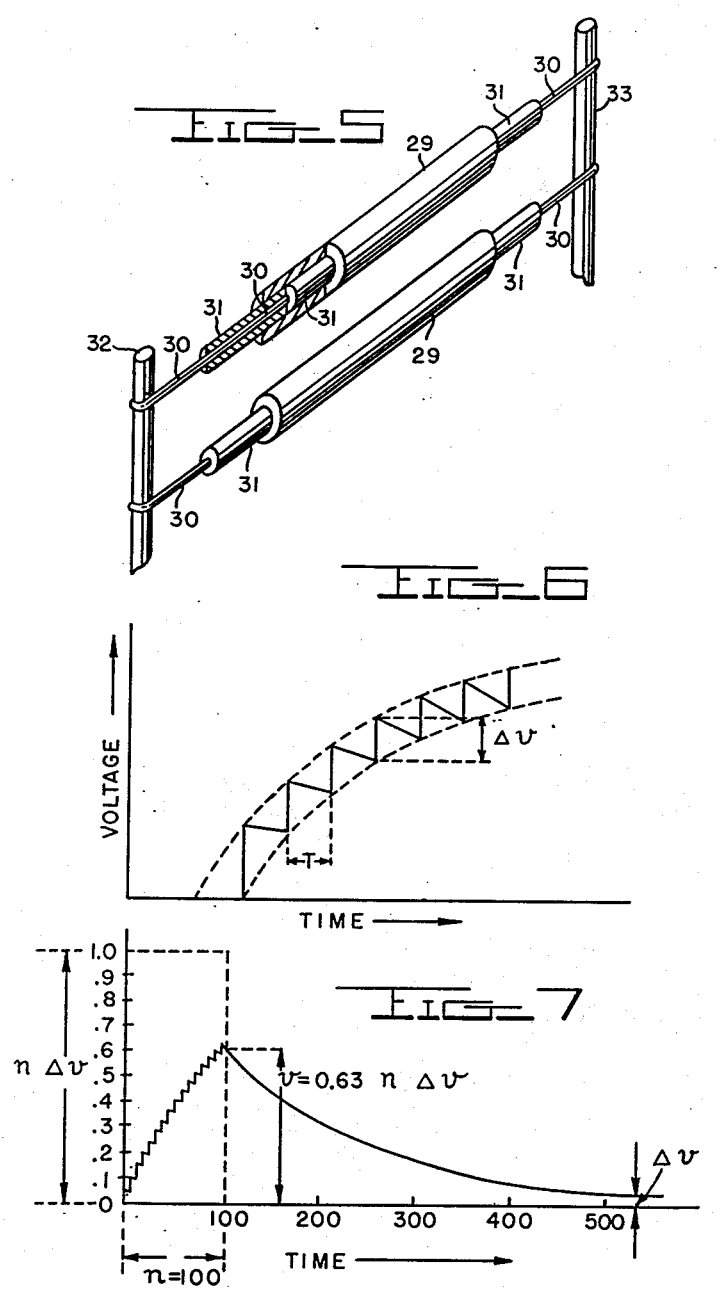

June 15, 1954  A. V. HAEFF  2,681,425
SIGNAL INTEGRATING TUBE
Filed Jan. 10, 1947  4 Sheets-Sheet 4
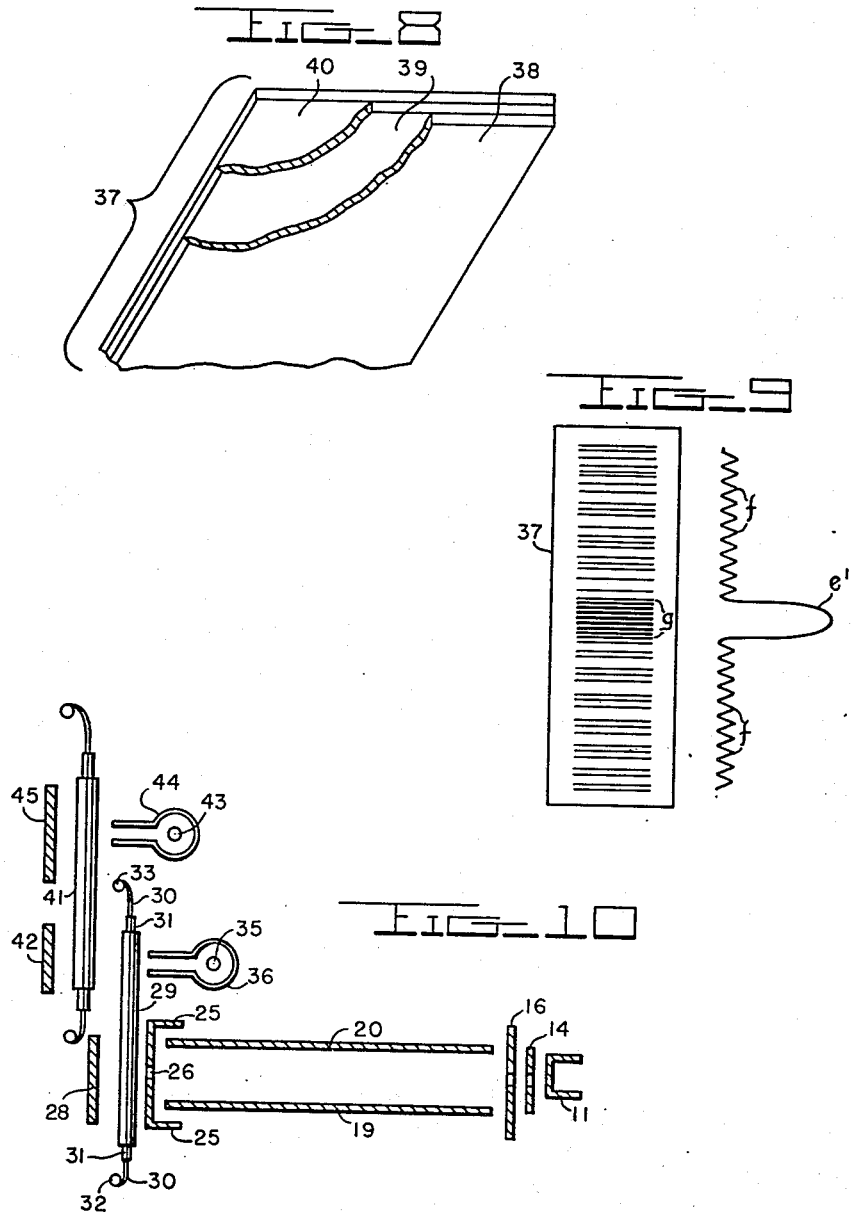
Inventor
ANDREW V. HAEFF
By M. C. Hayes
Attorney

Patented June 15, 1954

2,681,425

UNITED STATES PATENT OFFICE 2,681,425

SIGNAL INTEGRATING TUBE

Andrew V. Haeff, Washington, D. C.

Application January 10, 1947, Serial No. 721,333

10 Claims. (Cl. 315—13)

(Granted under Title 35, U. S. Code (1952), sec. 266)

This invention relates to electronic devices and more particularly to a means for increasing the signal to noise ratio of energy trains.

The degree of accuracy obtainable when interpreting intelligence transmitted through the medium of an energy train is governed by the ability of an individual to differentiate the intelligence characterized energy components from spurious energy components of the energy train, through oral or visual means. The degree of accurate interpretation is proportional to the signal to noise ratio of the energy train. The foregoing may be more readily understood with reference to conventional radio echo ranging apparatus wherein an energy train, including cyclical energy components or echo signals from remote objects detected by the apparatus, and non-cyclical energy components, or spurious energy signals produced by noise generated in the receiving channels of the apparatus or from external interferences, is received and interpreted to obtain range indications of the remote object. This energy train is applied to a cathode ray device to modulate the electron beam thereof. Deflection means are provided to cyclically sweep the electron beam in synchronism with the cyclical energy components of the energy train and to thereby produce a visual indication on the screen of the cathode ray device which is an instantaneous picture showing the proportional relationship in space of the remote objects with respect to the location of the ranging apparatus. Since the non-cyclical energy components modulate the electron beam indications thereof will also appear on the screen reducing the clearness of the echo indications. Accuracy of range indication obtained from the foregoing presentation is therefore governed by the ability of the operator to differentiate between the echo indications and the spurious energy indications. By increasing the signal to noise ratio of the intelligence characterized energy train an increase in the accuracy of interpretation is obtained.

It is therefore an object of the present invention to provide novel means to increase the signal to noise ratio of an energy train.

Another object is to provide a novel electronic device so characterized to selectively amplify only certain energy components of an energy train.

Still another object of the present invention is to provide a novel electronic device designed in such a manner as to preferentially amplify cyclical energy components of an energy train.

Still another object is to provide a novel electronic device for discriminating against spurious energy components of an energy train.

Still another object is to provide a novel electronic device including means responsive to synchronous cyclical sweeping of an electronic beam modulated in accordance with an energy train for selectively storing certain energy components of the energy train in an additive manner while minimizing additive storage of other energy components of the energy train.

Still another object is to provide a novel electronic device including means responsive to synchronous cyclical sweeping of an electronic beam modulated in accordance with an energy train to selectively store cyclical energy components of the energy train in an additive manner while preventing additive storage of non-cyclical energy components of the energy train.

Still another object is to provide a novel electronic device designed in such a manner as to integrate cyclical energy components of an energy train.

Still another object of the present invention is to provide a novel electronic device for integrating cyclical energy components of an energy train in such a manner as to increase the signal to noise ratio of the energy train by an amount substantially equal to the square root of the number of times the cyclical energy components reoccur during the integrating period.

Other objects and features of the present invention will appear more fully hereinafter from the following detailed description when considered in connection with the accompanying drawings which disclose several embodiments of the invention. It is expressly to be understood, however, that the drawings are designed for the purpose of illustration only and are not to be considered as a definition of the limits of the invention, reference for the latter purpose being had to the appended claims.

In the drawings, wherein similar reference characters denote similar elements throughout the several views:

Figure 1 is the diagrammatic illustration of a cyclically deflected electron beam modulated in accordance with an energy train having cyclical energy components and non-cyclical energy components and an integrated energy train produced by the electronic device constructed in accordance with the principles of the present invention in response to application of such cyclically deflected electron beam;

Figure 2 is a diagrammatic illustration, partly in section and partly in circuit form, of an electronic device embodying the principles of the present invention;

Figure 3 is an elevational view of the device disclosed in Figure 2;

Figure 4 is a perspective view showing certain elements of the device disclosed in Figures 2 and 3 in greater detail;

Figure 5 is a perspective view showing certain other elements of the device disclosed in Figures 2, 3 and 4 in greater detail;

Figure 6 is a voltage-time curve showing the additive storage of energy in one of the energy storage elements disclosed in Figure 5 upon cyclical energization by equal energy components;

Figure 7 is a voltage-time curve showing the energy discharge characteristics of one of the storage elements disclosed in Figure 5;

Figure 8 is a diagrammatic illustration showing the construction of another element of the device disclosed in Figures 2, 3 and 4, in greater detail;

Figure 9 is a diagrammatic illustration of the indication produced by the device disclosed in Figures 2, 3, and 4, and Figure 10 is a diagrammatic showing of another embodiment of the present invention.

In accordance with the principles of the present invention means are provided for modulating an electron beam in accordance with an energy train having cyclical energy components and non-cyclical energy components and means for cyclically sweeping the electron beam in synchronism with the cyclical energy components of the energy train. An array of spaced energy storage elements is positioned in the sweep locus of the electron beam. Each of the storage elements is designed in such a manner as to additively store energy in response to energization by the electron beam when modulated in accordance with cyclical energy components and to discriminating against additive storage in response to energization by the electron beam when modulated in accordance with the non-cyclical energy components. By cyclically sweeping the modulated electron beam over the array of storage elements in synchronism with the cyclical energy components of the energy train is obtained. An indication of the energy train is produced in accordance with the integrated energy stored by the array of storage elements. Such a presentation of the energy train is characterized by an increased signal to noise ratio. The foregoing will be more readily understood with reference to Figure 1 of the drawings wherein Figure 1(a), 1(b) and 1(c) disclose the varying electron intensity of an electron beam, in accordance with an energy train having cyclical and non-cyclical energy components, throughout a plurality of sweeps thereof synchronized with the cyclical energy components. The cyclical energy component modulations $e$ occur at the same period of each sweep while the non-cyclical energy component modulations $f$ appear at random. Figure 1(d) discloses the integrated energy stored in the array of storage elements in response to cyclically sweeping of the modulated electron beam. The energy $e'$ stored in response to cyclical energy component modulations is an addition of a certain percentage of the energy of each of a plurality of cyclical energy components synchronously applied thereto, whereas the energy $f'$ stored in response to the non-cyclical energy component modulations is substantially equal in value to the non-cyclical energy component modulations of the electron beam during each sweep thereof. This figure is for purposes of illustration only, and it is to be expressly understood that the actual increase in signal to noise ratio is substantially equal to the square root of the number of times the cyclical energy components are synchronously applied during the integrating period.

Throughout the following description the energy train having cyclical and non-cyclical energy components is referred to as the energy train output of the receiver of radio echo apparatus wherein the cyclical energy components are echo signals and the non-cyclical energy components are spurious energy signals produced by noise within the receiver channels of the apparatus or from external interference. It is to be expressly understood that this reference is made for the purpose of clarity and illustration only and that the present invention is not limited to such specific utilization since any energy train having cyclical and non-cyclical energy components may be applied to the device to obtain the novel energy integration process and resulting increase in signal to noise ratio.

With reference more particularly to Figures 2, 3, and 4 of the drawings, the novel electronic device is disclosed therein including an evacuated envelope 10 in which a cathode 11 is mounted. Cathode heater element 12 is provided and is supplied with suitable potential not shown. An energy train having cyclical and non-cyclical energy components, such as the signal output of the receiver 13 of a radio echo ranging apparatus, is applied to the cathode 11 to modulate the electrons emitted therefrom in intensity and velocity. The electrons are accelerated while passing through apertured disc 14, held at negative potential with respect to the cathode 11 through a connection with biasing supply 15, and through apertured disc 16 held at positive potential with respect to the cathode 11. The accelerated electrons emerging from the apertured disc 16 are focused to a sharp beam by means of a focusing solenoid 17 mounted coaxial with and external to the envelope 10. The focusing solenoid 17 is energized from battery 18. A pair of rectangular electrostatic deflection plates, 19 and 20, are mounted in spaced relationship, adjacent the apertured disc 16, to provide a path therebetween for the electron beam. The deflection plates 19 and 20 are maintained at an average positive potential substantially equal to the potential of the apertured disc 16, through connections with the biasing supply 15. Linear deflection voltages are applied to the deflection plates 19 and 20 from a sweep circuit 21 to cyclically sweep the electron beam, when the solenoid 17 is energized, between the deflection plates 19 and 20 in a plane equally distant from and parallel to the vertical planes thereof, as viewed in Figure 4 of the drawings, in synchronism with the cyclical energy components of the energy train from the receiver 13. The electron beam is linearly deflected in the foregoing manner since the magnetic field produced by the focusing solenoid 17 is parallel to and surrounds the electron beam. The sweep circuit 21 is synchronized with the cyclical energy components of the energy train by a suitable means such as the arrangement utilized in conventional radio echo apparatuses as disclosed. The sweep circuit 21 operates in accordance with a synchronizing circuit 22 which also controls operation of pulse transmitter 23 of the radio echo apparatus through conventional electronic keying circuits. The output of the transmitter 23 is fed to a directional antenna 24. Energy emitted from the antenna 24 that impinges upon remote objects is reflected therefrom as echo signals which are absorbed by the antenna 24 and passed to the receiver 13.

A rectangular, U-shaped, elongated metallic shield 25 is positioned to enclose the ends of the deflection plates 19 and 20 remote from the apertured disc 16. The shield 25 is provided with a narrow longitudinal slit 26 extending through the entire length thereof parallel to the vertical planes of the deflection plates at an intermediate point therebetween. The shield 25 is maintained at approximately the same potential as the apertured disc 16 through a connection with the biasing supply 15 and functions to allow only a narrow beam of electrons to enter the area beyond the deflection plates through the slit 26. An array 27, of spaced energy storage elements, is positioned in the sweep locus of the electron beam in the area beyond the shield 25 and a collector anode 28 is positioned in the path of the electrons traversing the array 27. The collector anode 28 is maintained at positive potential through a connection with the biasing supply 15 for collecting electrons passing through the array 27, as will appear more fully hereinafter.

As mentioned heretofore, it is an object of the present invention to provide means responsive to a synchronous cyclically deflected electron beam modulated in accordance with an energy train for selectively integrating the energy train in such a manner as to additively store energy in response to cyclical energy component modulations while minimizing additive storage of energy in response to non-cyclical energy component modulations. The foregoing means comprises the array 27 of spaced energy storage elements. As shown more particularly in Figure 5 of the drawings, each storage element of the array 27 comprises an exposed cylindrical conductive surface 29 separated throughout the entire length thereof from a cylindrical conductive member 30 by high-resistance material 31. Conductive members 30 are connected to supporting conductive members 32 and 33 maintained at negative potential. The storage elements are of extremely small diameter and may be constructed by coating the members 30, which may take the form of wire having a small diameter, with an insulating coating such as the material used for heater insulation, and then applying a second coating of a conductive material, the exposed conductive surfaces 29, by sputtering, for example. The ends of the exposed conductive surfaces 29 are spaced from the members 30 by a portion of the insulating material 31. As shown more particularly in Figure 4, the array 27 is positioned in the sweep locus of the electron beam emerging through the slit 26 in such a manner that only the exposed conductive surfaces 29 are in the path of the electron beam. Therefore, when electrons impinge upon the exposed conductive surfaces 29 a difference in potential will exist between the exposed conductive surfaces and the conductive members 30. For a purpose that will appear more fully hereinafter, the insulating material 31 is designed to be an imperfect insulator having a leakage conductance of such value as to produce a discharge time constant for the storage elements appropriate to the characteristics of the energy train to be integrated.

The exposed conductive surfaces 29 receive an electron charge whenever the electron beam impinges thereon. The charge on the exposed conductive surfaces 29 will dissipate through the insulating material 31 to conductive members 30 in accordance with the discharge time constant of the storage elements. When the electron beam is not modulated in accordance with an energy train, an equal average number of electrons will impinge upon each of the exposed conductive surfaces 29 and an equal average number of electrons will dissipate from each of the exposed conductive surfaces 29 during the period of each sweep of the electron beam. However, when the electron beam is modulated in accordance with an energy train having cyclical energy components and non-cyclical energy components and when the beam is cyclically swept, in a linear manner across the storage elements, in synchronism with the cyclical energy components of the energy train, the electrons collected on the exposed conductive surfaces 29 will vary in accordance with the energy components of the energy train and the cyclical energy component modulations will energize the same exposed conductive surfaces 29 upon each linear sweep of the electron beam. As will appear more fully hereinafter, by constructing the storage elements to have a discharge time constant greater than the period of the deflected electron beam, the exposed conductive surfaces 29 will additively store electrons in response to cyclical energy component modulations upon a plurality of sweeps of the electron beam. Since the non-cyclical energy components of the energy train are not synchronized with the cyclical linear sweep of the electron beam no additive storage of electron energy will result in response to recurrent energization of exposed conductive surfaces 29 by the non-cyclical energy component modulations of the electron beam.

The foregoing is more readily understood with reference to Figure 6 of the drawings which illustrates the process of additively storing energy on one of the storage elements of the array 27 in response to synchronous application of cyclical energy components thereto. For the purpose of explanation the cyclical energy components are considered as being echo pulses reflected from remote objects detected by the radio echo apparatus diagrammatically disclosed in Figure 2. From this figure it can be seen that the potential on the exposed conductive surface 29 increases by a certain increment, $\Delta v$, upon application of each impulse thereto, while the energy dissipated from the exposed conductive surface 29, to supportive members 32 and 33, during the time T between application of impulses, is substantially less than the increment $\Delta v$. The foregoing is accomplished by constructing the storage elements to have a discharge time constant greater than the time T. The final potential on the exposed conductive surface 29 after synchronous application of a plurality of impulses thereto is the addition of a certain percentage of the energy value of each applied impulse. If $i$ represents the electron beam current applied to the exposed conductive surface 29 during sweep period $\Delta t$, and C is the capacitance of the storage element, the increment $\Delta v$ by which the potential of the exposed conductive surface will increase due to energy charge $i\,\Delta t$ is:

$$\Delta v = \frac{i \Delta t}{C}$$

During the period T between application of impulses the potential on the exposed conductive surface 29 will dissipate due to the finite leakage resistance R of the high resistance material 31. If the fraction $$m = e^{-\frac{T}{RC}}$$

denotes the change of potential during the time T, then the voltage V stored on the exposed conductive surface after application of n impulses is:

$$V = \Delta v(1 + m + m^2 + \cdots m^{n-1}) = \Delta v \frac{1-m^n}{1-m} = \frac{i\Delta t}{C} \times \frac{1-e^{-\frac{nT}{RC}}}{1-e^{-\frac{T}{RC}}}$$

In view of the foregoing, it is to be expressly understood that if the storage elements of the array 27 have discharge time constants greater than the time between application of impulses to the exposed conductive surfaces 29, the synchronous application of a plurality of impulses will produce a resulting potential on the exposed conductive surfaces 29 greater than the potential resulting from application of one impulse.

When the device is utilized in connection with radio echo apparatus as disclosed, the maximum value of the discharge time constant of the storage elements of the array 27 must be properly selected in order to render the device operable to provide indications of moving remote objects as well as to render the device operable, when the antenna of the radio echo apparatus is rapidly moved, to detect other remote objects. Under the foregoing conditions, the device is operable to provide an indication, characterized by an increased signal to noise ratio, of an energy train having variable cyclical energy components and non-cyclical energy components, and operable to rapidly indicate different energy trains with improved signal to noise ratios. In order to accomplish the foregoing, the discharge time constants of the storage elements is selected to be long with respect to the time between pulses but at the same time is limited in duration to allow the storage elements to discharge to the average potential value thereof within a short period of time following termination of application of impulses thereto. The foregoing is more readily understood with reference to Figure 7 of the drawings wherein the discharge characteristics of one of the storage elements is shown. In this specific example it is assumed that one-hundred pulses of constant amplitude are impressed upon one storage element. With the period between pulses T equal to 0.001 second, and with the storage element having a discharge time constant equal to 0.1 second, the potential will build up in 0.1 second to 0.63 of the value which would be obtained if the storage element had no leakage characteristics. This potential, as shown in Figure 7, will dissipate to the instantaneous value, $\Delta v$, thereof in 0.41 second following termination of application of pulses thereto. With such selection of the discharge time of the storage elements, the aforementioned additive increase in the potential on the exposed conductive surfaces 29 is obtained upon synchronous application of a plurality of impulses thereto while the storage element is so characterized that the potential stored thereby will rapidly dissipate when pulses are no longer applied thereto.

Means are also provided by the present invention to translate the potential stored by the array 27 into an observable indication. As shown more particularly in Figures 2 and 4, the foregoing means comprises an elongated cylindrical cathode 35 positioned adjacent the array 27 on one side thereof. The cathode 35 is positioned at right angles to the storage elements of the array 27 and is of sufficient length to extend beyond the upper and lower storage elements. An accelerating electrode 36 surrounds the cathode 35 except for a longitudinal opening therein adjacent the array 27 which extends parallel to the cathode 35 through the entire length thereof. The cathode 35 and the accelerating electrode 36 are maintained at suitable potentials through connections with the biasing supply 15 so that a constant stream of electrons is directed to the exposed conductive surfaces 29 of the storage elements at right angles thereto. A rectangular screen anode 37 is positioned on the other side of the array 27, opposite the longitudinal opening in the accelerating electrode 36, to collect electrons from the cathode 35 traversing the array 27. As shown in Fig. 8, the screen anode 37 comprises a rectangular strip of mica 38 having coatings of a conductive semi-transparent material 39 and fluorescent material 40, such as willemite, on the surface thereof. The screen anode 37 is maintained at positive potential through a connection with the biasing supply 15 as shown in Figure 2.

The electrons emitted by the cathode 35 and accelerated by the electrode 36 pass through the array 27 and collect on the screen 37, to produce an indication thereon. The intensity of illumination of the indication produced on the screen 37 in response to electrons collecting thereon is determined by the velocity and intensity of the electrons arriving at any particular point on the screen 37. The potentials on the storage elements control the electron flow from the cathode 35 to the screen 37. Therefore, the indication is produced on the screen 37 in accordance with the potential stored in the array 27. The cyclical energy components of the energy train will be observed on the screen 37 as dark lines in accordance with the additive potential stored by the storage elements, while the indication of the non-cyclical energy components will appear as a uniformly lighted area. In Figure 9, an indication on the screen 37 is shown in accordance with the integrated energy train disclosed in Figure 1(d). From this figure it is readily seen that the indication produced in accordance with the integrated cyclical energy components $e^1$ appears as an extremely dark area whereas the non-cyclical energy components produce only a uniformly lighted area since additive storage of potential in response to non-cyclical energy component modulations is discriminated against. The contrast between the cyclical energy component indication and the non-cyclical energy component indications on the screen 37 is substantially greater than what is obtained through operation of conventional indicating equipment used heretofore and therefore a corresponding increase in the accuracy of interpretation of such indication is obtained.

Another embodiment of the invention is shown in Figure 10 of the drawings. The electronic device constructed in accordance with this embodiment includes the novel means disclosed and described heretofore with the addition of means for producing an indication of an energy train having cyclical energy components and non-cyclical energy components so characterized to provide a further improvement in the contrast between the cyclical and non-cyclical energy component indications.

The device includes an evacuated envelope, not shown, housing apertured discs 14 and 16, deflection plates 19 and 20, shield 25, array 27 and collector plate 28 constructed, positioned, and supplied with suitable potentials in a manner similar to corresponding elements of the device disclosed in Figures 2, 3 and 4. The elongated cylindrical cathode 35 and the associated accelerating electrode 36 are positioned adjacent the array 27 on the side thereof with the shield 25 in the manner previously described. Therefore, the electrons emitted from the cathode 35 and accelerated by the electrode 36 will pass through the array 27 in accordance with the potential stored by the storage elements of the array 27.

This embodiment of the invention further includes a second array 41 of storage elements positioned in the path of the electrons from the cathode 35, passing through the array 27. The array 41 is constructed in a manner similar to the array 27 and includes a plurality of spaced storage elements of extremely small diameter each comprising an exposed conductive surface and a conductive member separated by a high resistance material having a selected leakage conductance. The array 41 is positioned so that the electrons impinge upon the exposed conductive surfaces of the storage elements. A collector plate 42 is positioned in the path of the electrons passing through the array 41. The plate 42 is maintained at high positive potential while the array 41 is biased at positive potential with respect to the cathode 35. An elongated cylindrical cathode 43 and an associated accelerating electrode 44, constructed similar to the cathode 35 and accelerating electrode 36, are positioned adjacent the array 41 on one side thereof. A rectangular anode screen 45, constructed in a manner similar to the anode screen 37 shown in Figure 8, is positioned on the other side of the array 41 in the path of the electrons from the cathode 43.

In operation of this embodiment, when the storage elements of the array 27 receive a potential charge in a manner described heretofore, a reduction in the number of electrons from the cathode 35 passing through the array 27 to the array 41 will occur, thus driving the storage elements of the array 41 more positive. When the storage elements of the array become more positive an increase in electron flow from the cathode 43, through the array 41, to the anode screen 45 occurs. The cyclical energy component indications will appear on the anode screen 45 as extremely bright lines, whereas the non-cyclical energy components will be observed as a uniformly dark area. This device provides an improvement in the contrast between the cyclical energy component indications and the non-cyclical energy component indications due to the amplification factor obtained through operation of the array 41 while a further increase in contrast is obtained by indicating the cyclical energy components as highly illuminated lines on a dark background.

There is thus provided by the present invention a novel electronic device for increasing the signal to noise ratio of an energy train. The several embodiments of the invention disclosed herein include novel means for integrating an energy train in such a manner as to additively store energy in response to cyclical energy components of the energy train while discriminating against additive storage of energy in response to non-cyclical energy components. The energy output is characterized with an increase in signal to noise ratio substantially equal to the square root of the number of occurrences of the cyclical energy components during the process of integration.

Although several embodiments of the invention have been dislosed and described herein it is to be expressly understood that various changes and substitutions may be made therein without departing from the spirit of the invention as well understood by those skilled in the art. For example, although the devices are disclosed in connection with radio echo ranging apparatus, it is to be expressly understood that the devices may be utilized to increase the signal to noise ratio of other energy trains having cyclical energy components and non-cyclical energy components.

The invention described herein may be manufactured and used by or for the Government of the United States of America for governmental purposes without the payment of any royalties thereon or therefore.

What is claimed is:

1. In combination, an array of selectively charged parallel spaced energy storage elements, an elongated cathode positioned parallel to said array in quadrature with said storage elements for directing a constant source of electrons thereto, an elongated anode positioned parallel to said array on the other side thereof in diametric relation with said cathode for collecting electrons traversing said array and means associated with said anode responsive to said traversing electrons to produce an indication in accordance with the charges on said storage elements.

2. A means for increasing the signal to noise ratio of an energy train having cyclical and non-cyclical energy components comprising an array of parallel spaced energy storage elements, means cyclically operative to selectively energize said storage elements in accordance with said energy train, each of said storage elements including means additively storing energy in response to said cyclical energy components while discriminating against additive storage of energy in response to said non-cyclical energy components, an elongated cathode positioned parallel to said array in quadrature with said storage elements for directing a constant source of electrons thereto and an elongated anode positioned parallel to said array in diametric relation with said cathode for collecting electrons traversing said array in accordance with said stored energy.

3. In combination, a first array of parallel spaced energy storage elements, means selectively charging the storage elements of said first array, means directing a constant source of electrons across said first array in quadrature with the storage elements thereof, a second array of parallel spaced storage elements positioned parallel to said first array in the path of the electrons traversing said first array, means directing a constant source of electrons across said second array in quadrature with the storage elements thereof and means collecting electrons traversing said second array.

4. A device for increasing the signal to noise ratio of an energy train having cyclical energy and random noise components comprising spaced electron storage elements, means for producing an electron beam modulated in accordance with said components and cyclically deflected over said storage elements in synchronism with said cyclical energy, an elongated cathode spaced from said storage elements for producing a sheet of electrons intersecting said storage elements, and anode means in spaced relationship to said cathode and separated from said cathode by said storage means, said anode being responsive to electron density to indicate the relative electron flow between the various storage elements.

5. A device for increasing the signal to noise ratio of an energy train having cyclical energy components comprising means producing a beam of electrons, means modulating said beam in accordance with said energy train, means cyclically deflecting said beam, a plurality of elongated storage elements positioned in a plane normal to the plane of said beam, each of said storage elements including means to additively store energy in response to electron beam modulation produced by said cyclical energy components while discriminating against additive storage of energy in response to electron beam modulations produced by said non-cyclical energy components, an elongated cathode positioned parallel to the plane of said storage elements and the plane of said cyclically deflected beam for directing electrons toward said storage means, an elongated anode parallel to and spaced from said cathode, the storage means being between said anode and cathode.

6. A device for increasing the signal to noise ratio of an energy train having cyclical signals and random variations comprising a pair of cathodes enclosed in a single evacuated envelope, a plurality of spaced electron storage elements, means including the first of said cathodes to produce an electron beam modulated in accordance with said energy train and cyclically deflected over said storage elements in synchronism with said cyclical signals, the second cathode of said pair being elongated and spaced from said storage elements for producing a sheet of electrons intersecting said storage elements, and anode means positioned in the plane of said sheet of electrons and separated from said second cathode by said storage elements, said anode being responsive to electron density to indicate the relative electron flow from said second cathode through the spaced storage elements.

7. A device for increasing the signal to noise ratio of an energy train having cyclical signals and random variations comprising a pair of cathodes enclosed in a single evacuated envelope, a plurality of spaced electron storage elements, means including the first of said cathodes to produce an electron beam modulated in accordance with said energy train and cyclically deflected over said storage elements in synchronism with said cyclical signals, the second cathode of said pair being elongated and spaced from said storage elements for producing a sheet of electrons intersecting said storage elements, indicating means positioned so as to be intersected by said sheet of electrons and separated from said second cathode by said storage elements, said indicating means being responsive to the density of electrons received through said storage elements.

8. The apparatus of the type described in claim 7 in which said indicating means comprises a second set of storage elements positioned to receive electrons from said elongated cathode in accordance with the charges on the respective elements of said first mentioned storage means, a second elongated cathode producing a sheet of electrons intersecting said second set of storage elements, and electron density responsive means positioned to receive the electrons emitted from said second cathode and passed between said second set of storage elements.

9. A device for increasing the signal to noise ratio of an energy train having cyclical energy and random noise components comprising spaced electron storage elements, means for producing an electron beam modulated in accordance with said components and cyclically deflected over said storage elements in synchronism with said cyclical energy, an elongated cathode spaced from said storage elements for producing a sheet of electrons intersecting said storage elements, and indicating means separated from said cathode by said storage means, said indicating means being responsive to the density of electrons passed between said storage elements.

10. The apparatus of the type described in claim 9 in which said indicating means comprises a second set of storage elements positioned to receive electrons from said elongated cathode in accordance with the charges on the respective elements of said first mentioned storage means, a second elongated cathode producing a sheet of electrons intersecting said second set of storage elements, and electron density responsive means positioned to receive the electrons emitted from said second cathode and passed between said second set of storage elements.

References Cited in the file of this patent

UNITED STATES PATENTS

| Number | Name | Date |
| --- | --- | --- |
| 2,293,899 | Hanson | Aug. 25, 1942 |
| 2,410,233 | Percival | Oct. 29, 1946 |
| 2,412,669 | Bedford | Dec. 17, 1946 |
| 2,451,484 | Gould et al. | Oct. 19, 1948 |